United States Patent
Kundermann (12) 
(10) Patent No.: US 6,431,335 B1
(45) Date of Patent: Aug. 13, 2002

(54) HYDRODYNAMIC TORQUE CONVERTER

(75) Inventor: Wolfgang Kundermann, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/615,219

(22) Filed: Jul. 13, 2000

(30) Foreign Application Priority Data

Jul. 13, 1999 (DE) .......................................... 199 32 576

(51) Int. Cl.$^7$ .............................................. F16D 33/00

(52) U.S. Cl. ................... 192/3.3; 192/3.33; 192/85 AA (58) Field of Search ................................ 192/3.3, 3.28, 192/3.33, 85 AA, 113.5, 57

(56) References Cited

U.S. PATENT DOCUMENTS

| | | | | |
|---|---|---|---|---|
| 5,417,315 A | * | 5/1995 | Fukunaga ................... | 192/3.3 |
| 6,016,894 A | * | 1/2000 | Kundermann ............... | 192/3.3 |
| 6,142,272 A | * | 11/2000 | Meisner et al. ........... | 192/3.3 X |
| 6,155,392 A | * | 12/2000 | Kundermann ............... | 192/3.3 |
| 6,244,401 B1 | * | 6/2001 | Maienschein et al. ....... | 192/3.3 |

FOREIGN PATENT DOCUMENTS

WO    WO 99/10663    3/1999    ........... F16H/45/02

* cited by examiner

Primary Examiner—Saúl Rodríguez
(74) Attorney, Agent, or Firm—Cohen, Pontani, Lieberman & Pavane (57) ABSTRACT

A hydrodynamic torque converter having a converter housing defining interior space for receiving a converter work fluid, a turbine wheel arranged in interior space of the converter housing and rotatable with respect to the converter housing, a lockup clutch having a coupling element axially displaceably arranged on the turbine wheel for selectively coupling the turbine wheel with the converter housing. The converter housing and the coupling element define a pressure fluid space capable of being filled with a pressure fluid. The interior space is separated from the pressure fluid space for preventing fluid communication between the interior space and the pressure fluid space. The hydrodynamic torque converter also has a first channel connected to the interior space for guiding converter work fluid into the interior space, a second channel connected to the interior space for guiding converter work fluid out of the interior space and a third fluid channel connected to the pressure fluid space for selectively directing pressure fluid into and out of the pressure fluid space. The coupling element is displaced for at least partially canceling a rotational coupling of the converter housing and the turbine wheel when pressure fluid is directed into the pressure fluid space.

12 Claims, 5 Drawing Sheets

HYDRODYNAMIC TORQUE CONVERTER

BACKGROUND OF THE INVENTION

1. Field of the Invention

The present invention is directed to a hydrodynamic torque converter comprising a converter housing whose interior space is filled or can be filled with a converter work fluid, a turbine wheel which is arranged in the converter housing so as to be rotatable with respect to it, a lockup clutch by which the turbine wheel can be selectively coupled with the housing for common rotation, wherein the lockup clutch comprises a coupling element which is displaceable for producing the rotational coupling of the converter housing and turbine wheel, a first fluid channel arrangement for directing converter work fluid into the interior space of the converter housing, a second fluid channel arrangement for guiding converter work fluid out of the interior space of the converter housing, and a third fluid channel arrangement through which pressure fluid can be directed into or out of a pressure fluid space provided in the converter housing for the displacement of the coupling element, wherein there is no connection between the pressure fluid space and the interior space of the converter housing allowing an exchange of converter work fluid.

2. Description of the Related Art

A hydrodynamic torque converter in which a pressure fluid space is separated from the converter work fluid space is known. The pressure fluid space acts upon or displaces the coupling element, i.e., the pressure fluid space is sealed so as to prevent entry to converter work fluid. This is generally referred to as a converter with a closed three-line system. A hydrodynamic torque converter of this type is disclosed in WO 99/10663. A torque converter of this kind has an advantage over other types of converter in that the amount of converter work fluid in the interior of the converter housing is not affected by the supply of pressure fluid to the pressure fluid space. This is true regardless of whether the lockup clutch is in the engaged or disengaged state. In the hydrodynamic torque converter known from the prior art, the coupling element is displaced in a direction in which it acts upon friction linings through the supply of pressure fluid into the pressure fluid space, to produce rotational coupling of the turbine wheel and converter housing. For this purpose, the pressure fluid space is formed between the coupling element and an area of the converter housing, resulting in a very simple construction of a torque converter having relatively few parts.

A problem resulting from this construction and this manner of operation is that the coupling element must be displaced against the pressure of the converter work fluid prevailing in the converter interior in order to engage the lockup clutch. This means that if the coupling element is to generate a predetermined contact pressing pressure on the friction linings for producing the lockup state, it must be acted upon by a pressure in the pressure fluid space which appreciably exceeds the pressure of the converter work fluid prevailing in the converter interior. This requires a pump with a correspondingly high output. In the lockup state in which the torque converter does not perform its converter function, the pressure of the converter work fluid can be lowered, so that the pressure in the pressure fluid space can be lowered in a corresponding manner to save energy. However, if a spontaneous transition to the converter function occurs, the pressure of the converter work fluid prevailing in the interior of the converter housing in this operating state is often too low, so that cavitation problems can occur.

SUMMARY OF THE INVENTION

It is the object of the present invention to provide a hydrodynamic torque converter with increased output efficiency.

Briefly stated, the present invention is a hydrodynamic torque converter comprising a converter housing whose interior space is filled or can be filled with a converter work fluid, a turbine wheel which is arranged in the converter housing so as to be rotatable with respect to it, a lockup clutch by which the turbine wheel can be selectively coupled with the housing for common rotation, wherein the lockup clutch comprises a coupling element which is displaceable for producing the rotational coupling of the converter housing and turbine wheel, a first fluid channel arrangement for directing converter work fluid into the interior space of the converter housing, a second fluid channel arrangement for guiding converter work fluid out of the interior space of the converter housing, and a third fluid channel arrangement through which pressure fluid can be directed into or out of a pressure fluid space provided in the converter housing for the displacement of the coupling element, wherein there is no connection between the pressure fluid space and the interior space of the converter housing allowing an exchange of converter work fluid.

Further, according to the invention, the pressure fluid space can be filled with pressure fluid for displacing the coupling element for at least partial cancellation of the rotational coupling of the converter housing and turbine wheel.

In contrast to the prior art, the present invention accordingly displaces the coupling element for canceling the rotational coupling of the converter housing and turbine wheel, i.e., for disengaging the lockup clutch against the pressure of the converter work fluid prevailing in the interior space of the converter housing, by filling the pressure fluid space with pressure fluid. This results in some substantial advantages with respect to operation which have a positive effect on the efficiency of the converter operation in particular. First, the pressure fluid space need only be filled with pressure fluid when the lockup clutch is to be partially or fully disengaged. However, this operating state occurs only relatively briefly during normal driving, for example when starting or shifting gears. During normal driving, the converter does not perform its converter function, but rather is bypassed by the engagement of the lockup clutch. Therefore, the time period during which a pump must be put into operation for filling the pressure fluid space with pressure fluid is clearly reduced. Further, the pressure of the converter work fluid prevailing in the interior space of the converter housing in the engaged state of the lockup clutch acts upon the coupling element due to the reduction of fluid pressure in the pressure fluid space and presses the coupling element for engaging the lockup clutch. Consequently, it is not necessary to work against the pressure of the converter work fluid prevailing in the interior space of the converter housing for engaging the lockup clutch; rather, this pressure can be utilized in a positive fashion to produce the lockup state. This means that the fluid pressure in the interior space of the converter housing can be held at a normal or high level also in the lockup state, so that spontaneous transitions in converter operation also do not lead to cavitation problems or loss of output.

A further embodiment of the present invention is a hydrodynamic torque converter in which that the interior space of the converter housing is divided or can be divided into a first converter work fluid space and a second converter work fluid space by the coupling element.

According to another aspect of the present invention, the object stated above can be met by a hydrodynamic torque converter comprising a converter housing whose interior space is filled or can be filled with a converter work fluid, a turbine wheel which is arranged in the converter housing so as to be rotatable with respect to it, a lockup clutch by which the turbine wheel can be selectively coupled with the housing for common rotation, wherein the lockup clutch comprises a coupling element which is displaceable for producing the rotational coupling of the converter housing and turbine wheel, a first fluid channel arrangement for directing converter work fluid into the interior space of the converter housing, a second fluid channel arrangement for directing converter work fluid out of the interior space of the converter housing, and a third fluid channel arrangement through which pressure fluid can be guided into or out of a pressure fluid space provided in the converter housing for the displacement of the coupling element, wherein the interior space of the converter housing is divided or can be divided into a first converter work fluid space and a second converter work fluid space, one of which communicates with one of the fluid channel arrangements of the first and second fluid channel arrangement.

Accordingly, it is further provided in this hydrodynamic torque converter that the other converter work fluid space communicates with the other fluid channel arrangement of the first and second fluid channel arrangements.

Also, the efficiency of an entire torque converter system, especially also in the region of the lockup clutch, can be increased by such an arrangement. This arrangement ensures that the circuit of the converter work fluid, i.e., the supply of converter work fluid and the discharge of converter work fluid, can be directed in a defined manner via the area of a friction lining arrangement, so that defined cooling conditions can be adjusted in this case without having to utilize the supply of fluid to the pressure fluid space for this purpose as is the case, for instance, with torque converters with an open three-line system.

In a construction of this type, it can preferably be provided that the pressure fluid space does not communicate so as to exchange converter working fluid with the interior space of the converter housing. Further, it is advantageous when the pressure fluid space can be filled with pressure fluid for the displacement of the coupling element for at least partial cancellation of the rotational coupling of the converter housing and turbine wheel.

According to another aspect of the present invention, a pressure fluid space housing can be provided in a hydrodynamic torque converter, this pressure fluid space housing at least partially defining the pressure fluid space at a first side and defining one of the converter work fluid spaces at least in some areas at a second side. In this way, a simple spatial division into one of the converter work fluid spaces on the one hand and of the pressure fluid space on the other hand can be achieved. In this respect, it is preferably provided that the pressure fluid space housing is arranged between the coupling element and the converter housing, wherein the pressure fluid space housing, together with the coupling element, defines the pressure fluid space at least in some areas and, together with the converter housing, defines the one converter work fluid space at least in some areas.

The coupling element can be guided at the pressure fluid space housing in its radial outer area so as to be displaceable in the direction of a rotational axis of the converter in a fluid-tight manner.

In a further embodiment of the present invention, the pressure fluid space housing is connected with the converter housing so as to be substantially fixed with respect to rotation relative to it. This leads to the advantage that the torque converter can be constructed in a simple manner in such a way that the lockup clutch has at least one friction surface element which is connected with the turbine wheel so as to be essentially fixed with respect to rotation relative to it and which can be clamped between the converter housing and the coupling element for producing the rotational coupling of the turbine wheel and converter housing. In this case, a relatively large quantity of friction surfaces and a correspondingly strong rotational coupling can be produced between the converter housing and turbine wheel.

Alternatively, it is possible that the pressure fluid space housing is connected with the turbine wheel so as to be essentially fixed with respect to rotation relative to it. In this case, the coupling element can preferably be pressed against the converter housing with the intermediary of a friction lining to produce the rotational coupling of the turbine wheel and converter housing.

To prevent problems with the sealing of the pressure fluid space and to transfer the torque or at least a portion thereof, the pressure fluid space housing may be connected with the coupling element so as to be substantially fixed with respect to rotation relative to it. This can be provided, for example, by a connection arrangement acting in a positive-locking manner in the circumferential direction. Alternatively, the connection may comprise a plurality of leaf spring-like connection elements by means of which the coupling element is essentially fixedly connected with the pressure fluid space housing.

The present invention is described in detail in the following with reference to the accompanying drawings based on preferred embodiment forms.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
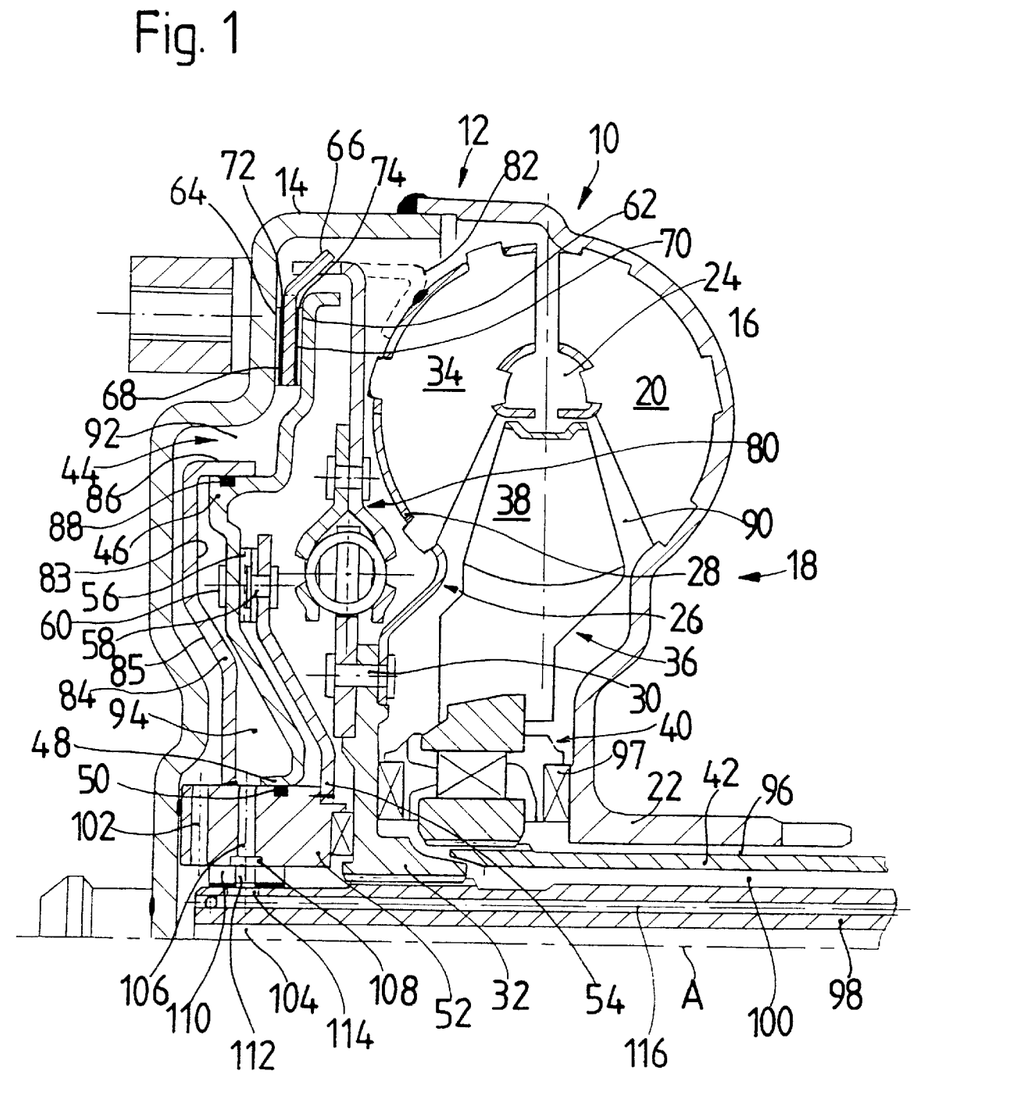
FIG. 1 is a partial longitudinal sectional view of an embodiment of a hydrodynamic torque converter according to the present invention.

FIG. 1 shows a hydrodynamic torque converter 10 according to a first embodiment of the present invention. This torque converter 10 comprises a converter housing 12 which is substantially formed of a housing cover 14 and an impeller wheel shell 16 of an impeller wheel 18. The impeller wheel shell 16 carries, at its inner side, a plurality of impeller wheel blades 20 arranged successively in the circumferential direction and is coupled by its hub area 22 to a pump (not shown) by which converter work fluid can be conveyed into an interior space 24 formed in the converter housing 12. Further, a turbine wheel 26 is arranged in the interior space 24 and has a turbine wheel shell 28 and a turbine wheel hub 32 connected therewith, for example, by means of rivet bolts 30, for common rotation. At its side facing the impeller wheel shell 16, the turbine wheel shell 28 carries a plurality of turbine wheel blades 34 arranged successively in the circumferential direction. A stator wheel 36 which carries a plurality of stator wheel blades 38 and is supported on a supporting shaft 42 via a freewheel 40 is located axially between the turbine wheel 26 and the impeller wheel 18.

A lockup clutch 44 lies between the housing cover 14 and the turbine wheel 26. This lockup clutch 44 comprises a coupling piston 46 forming a coupling element which, as will be described in the following, is displaced in the direction of a converter rotational axis A for producing or canceling the lockup state.

The coupling piston 46 is guided so as to be axially displaceable in a fluid-tight manner in its radial inner area with a cylindrical portion 48 with the intermediary of a sealing element 50 on a housing hub or cover hub 52 which is fixedly connected, e.g., by welding, with the housing cover 14. A disk-like driver element 54 is secured to the cover hub 52, e.g., by welding. In its radial outer area, the driver element 54 has a plurality of connection elements 56 such as, for example, leaf springs which extend essentially in the circumferential direction and which are fastened to the driver element 54 in their end areas by rivet bolts 58 and to the piston 46 in their other end area by rivet bolts 60. In this manner, the piston 46 is connected with the driver element 54, the cover hub 52 and therefore the housing cover 14 and the housing 12 so as to be essentially fixed with respect to rotation thereto while retaining its axial movability. In its radial outer area, the piston 46 has a friction surface area 62 which is located axially opposite from a corresponding friction surface area 64 of the housing cover 14. A friction lining arrangement, for example, in the form of a clutch plate 66, is arranged between the friction surface areas 62, 64 and carries friction linings 68, 70 at both of its axial sides. Fluid flow channels 72, 74 may, for example, be provided in these friction linings 68, 70. The clutch plate 66 communicates with the turbine wheel 26 so as to be fixed with respect to rotation relative to it via a toothing arrangement or the like. This can be carried out, for example, via a torsional vibration damper 80 which is shown in FIG. 1 and which can be connected with, for example, the turbine wheel shell 28 and/or the turbine wheel hub 32 or can be effected via an element 82 which is fixedly connected with the turbine wheel shell 28.

Further, a housing part 84 is fixedly connected in its radial inner area with the converter hub 52 by welding and has, in its radial outer area, a cylindrical portion 86. At the inner circumferential surface of the cylindrical portion 86, the piston 46 is guided so as to be displaceable in the direction of the axis of rotation A in a fluid-tight manner by a corresponding shoulder with the intermediary of a sealing element 88.

With respect to the torque converter 10, according to the invention, it will be seen that the interior space 24 of the converter housing 12 is divided into two converter work fluid spaces. A first converter work fluid space 90 is located between the impeller wheel shell 16 and the piston 46 and contains the turbine wheel 26 and stator wheel 36 as well as the torsional vibration damper 80 insofar as the latter is provided. A second converter work fluid space 92 is essentially defined between the piston 46 or a side 85 of the housing part 84 and the housing cover 14. The transition between the first and the second converter work fluid space 90, 92 lies in the area of the friction surfaces 62, 64 and the clutch plate 66. Further, it will be seen that a pressure fluid space 94 is defined by the piston 46 and the housing part 84 at its side 83. This pressure fluid space 94 is sealed so as to be tight against fluid due to the tight bearing support of the piston 46 at the housing part 84 on one side and the cover hub 52 on the other side, as well as the tight connection of the housing element 84 to the cover hub 52 toward the interior space 24 of the converter housing 12, i.e., relative to the first converter work fluid space 90 as well as to the second converter work fluid space 92. The converter work fluid arranged in the interior space 24 of the housing 12 is prevented from entering the pressure fluid space 94 and, in a corresponding manner, the pressure fluid contained in the pressure fluid space 94 is prevented from entering the interior space 24 of the converter housing 12, i.e., it cannot enter the converter work fluid space 90 or converter work fluid space 92.

The supply of converter work fluid to the interior space 24 of the converter housing 12 can be carried out via an intermediate space 96, which is formed between the impeller wheel hub 22 and the supporting shaft 42, and the bearing arrangement 97 supporting the stator wheel 36 at the impeller wheel shell 16 and at the turbine wheel 26. Further, an intermediate space 100 which is formed between the supporting shaft 42 and a driven shaft 98 formed as a transmission input shaft, for example, can likewise be used or can also be used as an alternative to the supply of converter work fluid. It is noted that the shaft 98 is connected with the turbine wheel 26 so as to be fixed with respect to rotation relative to it. The intermediate spaces 96 and/or 100 and the intermediate spaces formed in the region of the bearing arrangement 97 accordingly form a first fluid channel arrangement through which the work fluid can enter the interior space of the converter housing 12, i.e., in particular the first converter work fluid space 90.

The discharge of the converter work fluid from the interior space 24 can be effected in the region of the second converter work fluid space 92. For this purpose, the cover hub 52 has one or more essentially radially extending through-openings 102 along which the converter work fluid can flow out of the second converter work fluid space to the shaft 98. The shaft 98 has a central through-bore hole or through-opening 104 through which the converter work fluid can then be guided off. This opening 104, together with openings 102, forms a second fluid channel arrangement. It is noted that the flow direction can obviously also be reversed, i.e., the converter work fluid can be introduced via opening 104 and opening 102 into the converter work fluid space 92. The converter work fluid in the converter work fluid space 92 can enter the converter work fluid space 90 via the channels or grooves 72, 74 or the opened lockup clutch 44, and be drawn off from the converter work fluid space 90 via the bearing arrangement 97 and the intermediate spaces 96, 100.

For supplying the pressure fluid space 94 with pressure fluid, the cover hub 52 has a second set of through-openings 106 which extend essentially radially. These through-openings 106 open on the radial outer side into a region formed between the cylindrical portion 48 of the piston 46 and the housing part 84. The openings 106 open on the radial inner side into an annular space 108 extending in the circumferential direction at the inner circumferential surface of the cover hub 52. In this region, the shaft 98 is rotatably supported at the housing 12, i.e., at the cover hub 52, via a sliding bearing element 110. The sliding bearing element 110 which can carry a sliding bearing lining or the like on its inner circumferential surface likewise has through-openings 112 which open radially outward into the annular space 108 and which communicate with a channel 116 on the radial inner side via a respective opening 114. This channel 116 is located radially outside of the central through-opening 104 and is tightly sealed at the axial end of the shaft 98, for example, by pressing in a ball or the like. A plurality of such channels 116 and openings 114 are provided so as to be distributed in the circumferential direction. The pressure fluid can enter the pressure fluid space 94 or be withdrawn from the latter via these channels 116 and openings 114 and via openings 112 and 106 which, together, form a third fluid channel arrangement.

The operation of the torque converter shown in FIG. 1 for producing and in particular for canceling the lockup state, is described in the following.

In an operating state in which the torque converter 10 is to perform its converter function, i.e., the turbine wheel 26 is to be essentially freely rotatable with respect to the housing 12, pressure fluid whose pressure is somewhat higher than the pressure of the converter work fluid in the interior space 24 is supplied to the pressure fluid space 94. In this way, the piston 46 is displaced toward the right with respect to the view in FIG. 1, i.e., away from the housing cover 14 and toward the turbine wheel 26. In so doing, the clutch plate 66 is released, i.e., it is not clamped between the friction surfaces 62, 64. Since a pressure in the pressure fluid space which is slightly greater than the pressure of the converter work fluid prevailing in the interior space 24 is sufficient for disengaging the lockup clutch 44, it is sufficient in this case to provide a feed pump with a relatively low pumping capacity, i.e., it is not necessary to provide a pump that is constructed for generating pressures substantially higher than the pressure of the converter work fluid prevailing in the interior space 24.

In order to produce the lockup state, the pressure of the pressure fluid in the pressure fluid space 94 is released, so that the pressure of the converter work fluid prevailing in the interior space 24 of the converter housing 12 is higher than the pressure in the pressure fluid space 94. The piston 46 is then pressed in the direction of the housing cover 14, so that the plate 66 with its friction linings 68, 70 is now clamped between the piston 46 and the housing cover 14, and the turbine wheel 26 is therefore connected with the housing 12 for common rotation, possibly while allowing a certain degree of slip. Since the discharge or supply of pressure fluid to the pressure fluid space 94 does not lead to a simultaneous supply or discharge of fluid in the interior space 24 of the converter housing 12 (the slight change in volume in the interior space 24 due to the slight enlargement or reduction of the pressure fluid space 94 is not taken into account here), the converter characteristic and output capacity of the converter remain essentially unimpaired. In particular, with the releasing of the pressure in the pressure fluid space 94 the pressure of the converter work fluid prevailing in the interior space 24 of the torque converter 10 can be fully utilized to produce the contact pressing force of the lockup clutch 44. This, in turn, means that a very high contact pressing pressure of the lockup clutch can be achieved with a relatively small-capacity feed pump. This is especially significant because the operating state in which the lockup clutch 44 is engaged clearly predominates with respect to time over an operating state in which the lockup clutch 44 is disengaged and must accordingly deliver pressure fluid into the pressure fluid space 94.

As a further advantage of the embodiment of the invention in which the interior space 24 is divided by the piston 46 into the two converter work fluid spaces 90, 92 and the supply or discharge of converter work fluid can be carried out via these two converter work fluid spaces, a cooling of the lockup clutch 44 may take place in a defined manner by the flowing of converter work fluid along the friction linings 68, 70. This is especially significant in slip operation. However, it should be noted that the channels or grooves 72, 74 that can be seen in FIG. 1 need not necessarily be provided in the friction linings 68, 70. It is also possible to provide nozzle-like openings in the piston 46 for the passage of converter work fluid from one converter work fluid space to the other.

Figure 2:
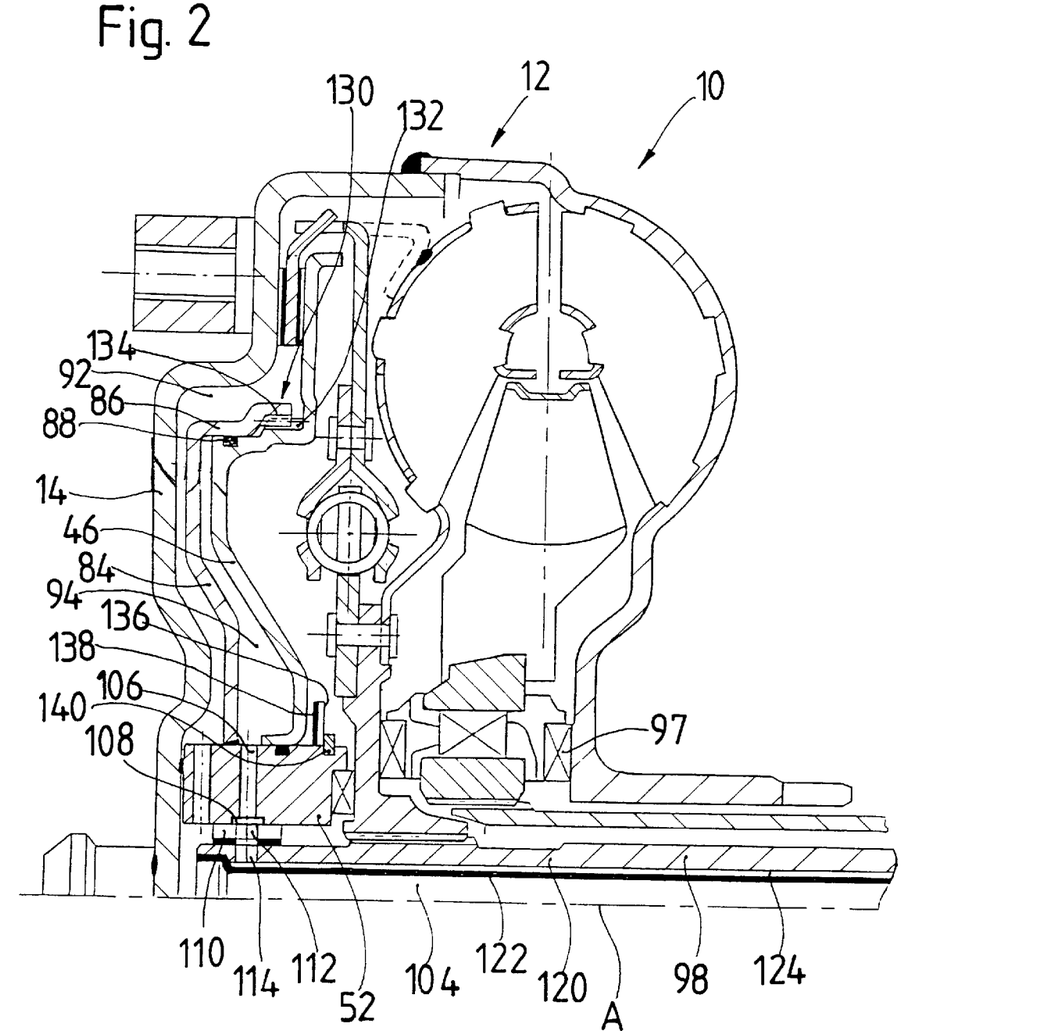
FIG. 2 is a partial longitudinal sectional view of a modification of the embodiment corresponding to FIG. 1.

FIG. 2 shows a modification of the embodiment described above. The following description relates essentially to differences in construction.

It will be seen in this case that the shaft 98 comprises an outer shaft jacket 120 in which a tube part 122 is inserted in such a way that it is connected in a fluid-tight manner with the jacket 120 in the axial end region near the housing cover 14, for example, by pressing in or the like. The tube part 122 then forms the central opening 104 by which the converter work fluid can be directed into or out of the converter work fluid space 92. The intermediate space 124 formed between the tube part 122 and the jacket 120 forms a channel by which the pressure fluid can reach the opening or openings 114, the openings 112 that are arranged substantially centrally in the sliding bearing part 110, the annular space 108, the openings 106 and the pressure fluid space 94.

Another difference in design involves the piston 46 being connected with the housing 12 so as to be fixed with respect to rotation relative to it by means of a positive engagement arrangement 130 acting between the piston 46 and the housing part 84. These two components have an external and internal toothing 132, 134 formed integral in their respective portions 86 and 136 which extend substantially axially. The teeth 132, 134 can be formed from sheet metal parts in a simple manner during manufacture of the housing part 84 or piston 46 in a shaping process by pressure rolling or the like. These teeth 132, 134 can be brought into engagement in that the piston 46 and housing part 84 are pushed one inside the other axially.

Since positive-locking engagement arrangements of this kind are generally subject to slight movement play, rattling noises can occur in the disengaged state of the lockup clutch due to the movement of the piston 46 relative to the housing part 84. In order to prevent this, a friction ring 136 is provided on the cover hub 52; this friction ring 136 can have a friction lining 138 at the axial side facing the piston 46, for example, or can be formed entirely of such material. The friction ring 136 is supported axially at a retaining ring or other securing element 140. When the piston 46 is displaced away from the housing cover 14 by increasing the fluid pressure in the pressure fluid space 94, its radial inner area comes into contact with the friction ring 136 and it is accordingly prevented from rotating substantially freely relative to the housing part 84. The occurrence of rattling can accordingly be reliably prevented.

Figure 3:
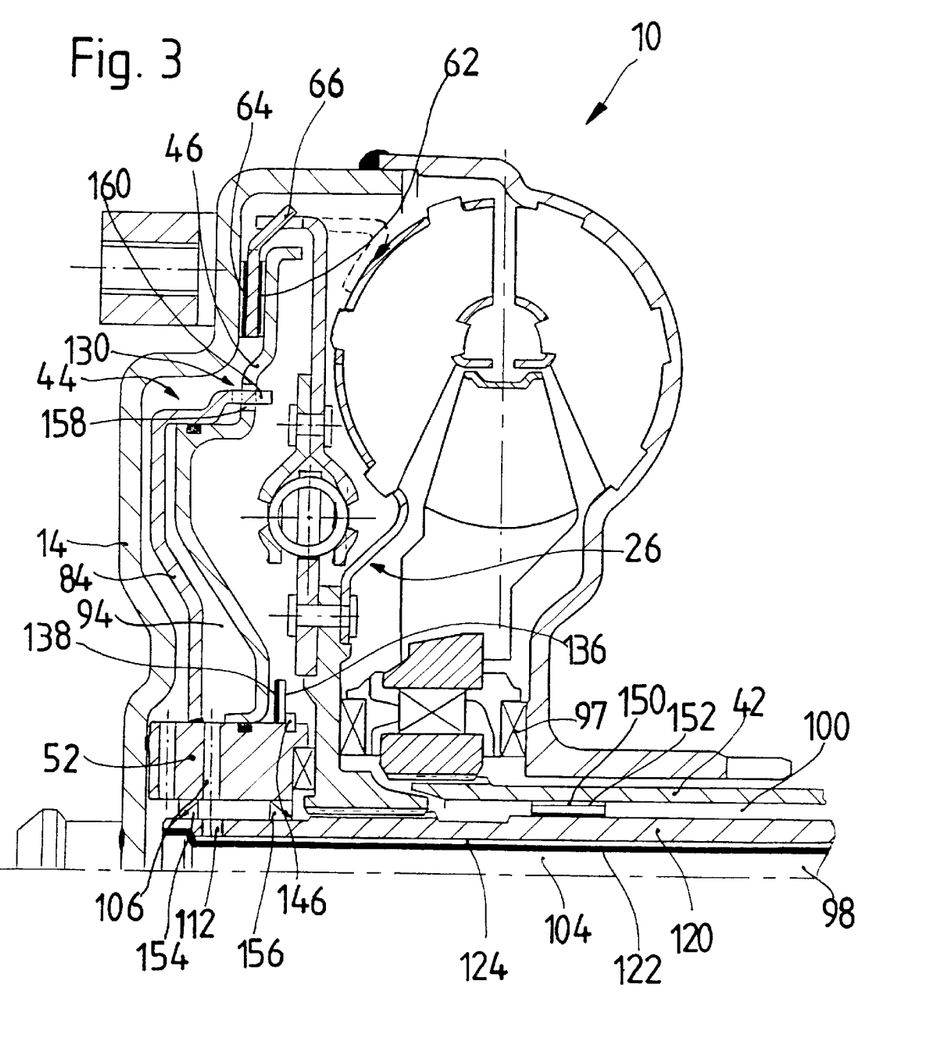
FIG. 3 is a partial longitudinal sectional view of another modification of the embodiment corresponding to FIG. 1.

Another modification of this embodiment of a hydrodynamic torque converter is shown in FIG. 3. Also, with reference to FIG. 3, only differences in construction in relation to the embodiment shown in FIG. 1 are discussed.

First, it will be seen that the shaft 98 is again formed of the shaft jacket 120 and the tube part 122. However, the shaft 98 is no longer supported in the area of its axial end near the housing cover 14, but rather is supported at the supporting shaft 42, for example, with the intermediary of a sliding bearing element 150. This sliding bearing element 150 can carry a sliding lining, for example, and can have axial grooves 152 which enable fluid to pass between the supporting shaft 42 and the shaft 98 via the intermediate space 100 as was described in the preceding with respect to FIG. 1.

The shaft 98 is now sealed in the area of its free end relative to the cover hub 52 by two annular sealing elements 154, 156. The two sealing elements 154, 156 lie axially on both sides of the openings 106 which lead through the cover hub 152 to the pressure fluid space 94. It is noted that the sealing elements 154, 156 can, of course, also be sealed or encapsulated bearing arrangements in order to support the shaft 98 in its axial end area as an alternative to or in addition to the sliding bearing element 152.

Further, it will be seen in FIG. 3 that the coupling between the piston 46 and the housing part 84, wherein they are fixed with respect to relative rotation, is produced by a positive-locking engagement arrangement 130 which comprises one or more openings 158 at the piston 46 in which respective projections 160 of the housing part 84 engage. Since a positive-locking engagement arrangement 130 of this type cannot be made completely free of play, it is also advantageous to provide the friction ring 136 with which the piston 46 can come into contact in the disengaged state of the lockup clutch 44 in order to suppress an essentially free vibration of the piston 46 relative to the housing part 84.

The embodiment described with reference to FIGS. 1 to 3 and the different modifications of the same show a torque converter in which the lockup clutch 44 provides at least two friction surface areas formed by the two friction linings 68, 70 of the plate 66. It is noted in this respect that it is possible, of course, to couple a plurality of clutch plates 66 with the turbine wheel 26 successively in the axial direction such that they are fixed with respect to rotation relative to it and to arrange a counter-plate between two such clutch plates 66, wherein the counter-plate is coupled with the piston 46 so as to be fixed with respect to rotation relative to it. In this way, the quantity of effective friction surface areas can be further increased.

Figure 4:
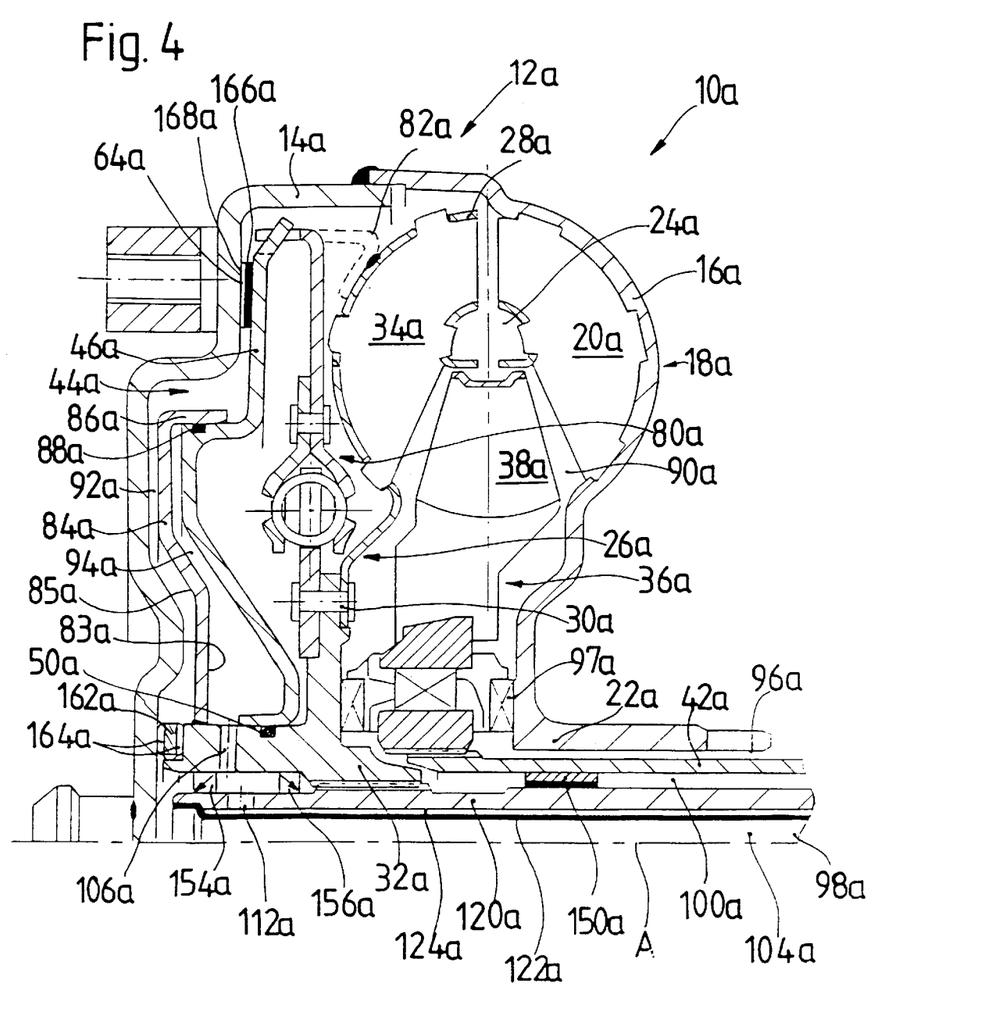
FIG. 4 is a partial longitudinal sectional view of an alternative embodiment of a hydrodynamic torque converter according to the present invention.

An alternative embodiment of the torque converter according to the invention is shown in FIG. 4. Components which correspond to previously described components with respect to construction or function are designated by the same reference numbers with the addition of a suffix "a".

In the embodiment shown in FIG. 4, the housing part 84a is no longer fixedly connected with a cover hub or the like, but rather is now connected with the turbine wheel hub 32a, for example by welding, especially by laser welding. This turbine wheel hub 32a is now supported axially with the intermediary of a sliding bearing ring 162a or the like at the housing cover 14a. In the sliding bearing ring 162a there are provided essentially radially extending grooves or channels 164a by which the converter work fluid can flow out of the converter work fluid space 92a to the central opening 104a of the shaft 98a, or vice versa. The central opening 104a together with the grooves or channels 164a forms the second fluid channel arrangement.

The piston 46a of the lockup clutch 44a is now also guided in its radial inner area on the turbine wheel hub 32a with the intermediary of the sealing ring 50a in a fluid-tight manner and so as to be axially displaceable.

The piston 46a engages on the radial outside with the torsional vibration damper 80a [or element 82a] so as to be fixed with respect to rotation relative to it and is accordingly held so as to be substantially fixed with respect to rotation relative to the turbine wheel 26a. In an attemative embodiment the piston 46a engages element 82a (shown in dotted lines) which is fixedly connected to the turbine wheel 26a. This also essentially causes the piston 46a to be positioned relative to the housing 84a so as to be fixed with respect to rotation relative to it. The piston 46a carries a friction lining 166a which can again have grooves or channels 168a, for example. The piston 46a can be pressed against the friction surface 64a of the housing cover 14 by this friction lining 166a when the fluid pressure decreases in the pressure fluid space 94a as was described above. Accordingly, a component or component group, namely, the plate or plates provided in the embodiment according to FIGS. 1 to 3, can be completely dispensed with. In principle, however, this embodiment also allows an expansion to a plurality of effective friction surface regions, i.e., 3 or 5 friction surface regions, when another or several more plates are coupled with the turbine wheel 26a so as to be fixed with respect to rotation relative to it, wherein counter-plates which are to be connected with the housing cover 14a so as to be fixed with respect to rotation relative to it are provided between these plates or a plate and friction lining 166a.

In other respects, the embodiment according to FIG. 4 corresponds essentially to the other embodiments described in the preceding with respect to construction and function.

Figure 5:
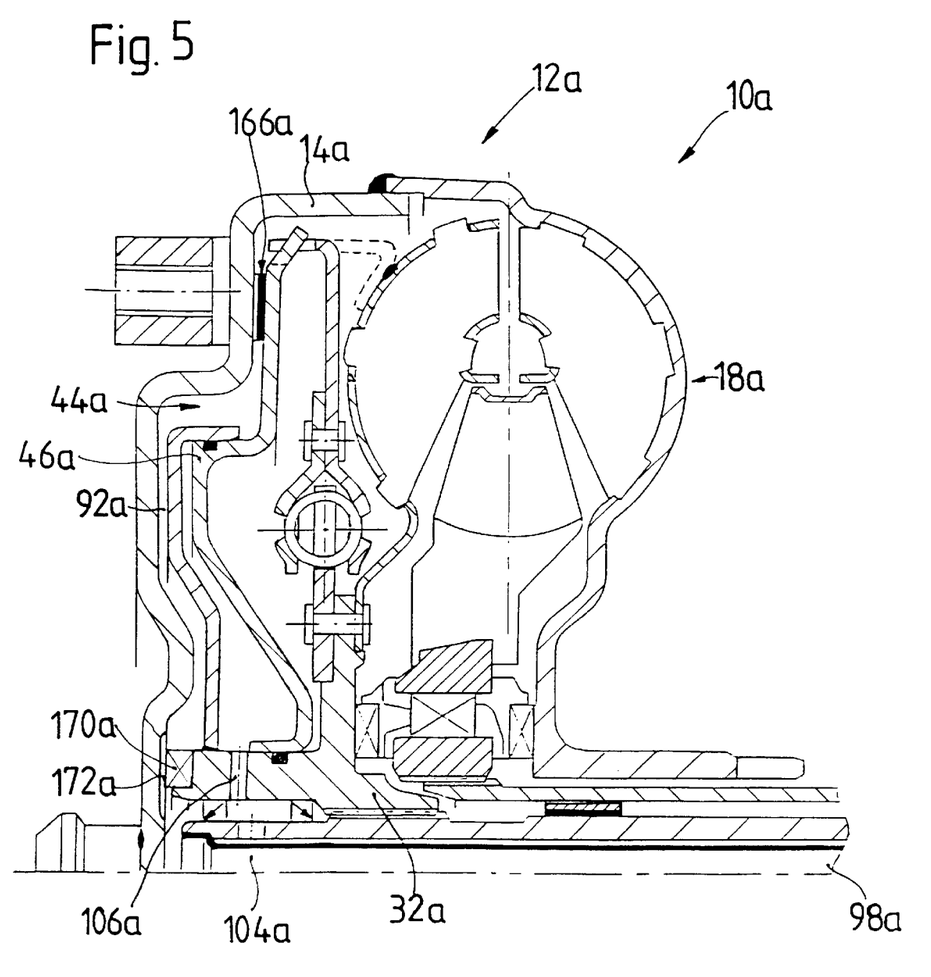
FIG. 5 is a partial longitudinal sectional view of a modification of the embodiment corresponding to FIG. 4.

FIG. 5 shows a modification of the embodiment shown in FIG. 4. The following description essentially concerns differences in construction.

It will be seen that the turbine wheel hub 32a is supported in this case axially via a bearing arrangement 170a at the housing cover 14a. In this case, this bearing arrangement 170a has no through-channels or the like. Instead, at least one depression 172a is formed in the housing cover 14a, e.g., by pressing in or the like, preferably a plurality of depressions 172a succeeding one another in the circumferential direction and extending substantially radially. The bearing arrangement 170a is bridged in the radial direction by these depressions 172a, so that the converter work fluid can flow out of the converter work fluid space 92a again via these depressions or channels 172 to or back from the central opening 104a of the shaft 98a.

In particular in the embodiments according to FIGS. 4 and 5, the displacement of the coupling piston 46a toward the housing cover 14 during engagement of the clutch leads to the advantage that it is not necessary for there to be a supporting of the piston force against the pump housing, as is the case in the prior art. A very high bearing load and an excessive introduction of force into the impeller wheel can accordingly be avoided. At the same time this leads to prevention of a corresponding deformation of the housing 12a. It is necessary only that the pressure exerted on the housing part 84a proceeding from the second converter work fluid space 92a be supported via the impeller shell 16a. This leads to a relatively small force to be supported in the indicated fluid circulation direction.

Finally, it is noted that the different variants shown in FIGS. 1 to 5 can, of course, be combined. Accordingly, the manner in which the pressure fluid is supplied to the pressure fluid space, i.e., particularly also the kind of construction of the shaft 98 or 98a or its bearing support can be combined with any type of lockup clutch or with any type of coupling between the housing part 84 or 84a and piston 46 or 46a such that the latter are fixed with respect to relative rotation. Further, when it has been stated in the present text that the interior space of the converter housing is divided into two converter work fluid spaces by the piston, this, of course, does not mean that only the piston carries out this function. It will be seen in the Figures that the friction linings or plates or other components that may be present can, of course, also contribute to this division.

The invention is not limited by the embodiments described above which are presented as examples only but can be modified in various ways within the scope of protection defined by the appended patent claims.

I claim:

1. A hydrodynamic torque converter, comprising:

a converter housing defining an interior space for receiving a converter work fluid;

a turbine wheel arranged in the interior space of the converter housing and rotatable with respect to the converter housing;

a lockup clutch having a coupling element axially displaceably arranged on the turbine wheel for selectively coupling the turbine wheel with the converter housing;

the converter housing and the coupling element defining a pressure fluid space capable of being filled with a pressure fluid;

the interior space being separated from the pressure fluid space for preventing fluid communication between the interior space and the pressure fluid space;

a first channel means operatively connected to the interior space for guiding converter work fluid into the interior space;

a second channel means operatively connected to the interior space for guiding converter work fluid out of the interior space;

a third fluid channel means operatively connected to the pressure fluid space for selectively directing pressure fluid into and out of the pressure fluid space, wherein the coupling element is displaced for at least partially canceling a rotational coupling of the converter housing and the turbine wheel when pressure fluid is directed into the pressure fluid space; and a pressure fluid space housing having a first side and a second side and being between a housing cover and a coupling piston of the torque converter, wherein the first side of the pressure fluid space housing defines at least a portion of the pressure fluid space and the second side defines at least a portion of the second converter work fluid space.

2. The hydrodynamic torque converter according to claim 1, wherein the pressure fluid space housing is arranged between the coupling element and the converter housing; at least a portion of the pressure fluid space is defined by the pressure fluid space housing and the coupling element; and at least a portion of the second converter work fluid space is defined by the pressure fluid space housing and the converter housing.

3. The hydrodynamic torque converter according to claim 1, wherein the coupling element is guided on the pressure fluid space housing in the direction of a converter rotational axis while maintaining separation of the converter work fluid and the pressure fluid.

4. The hydrodynamic torque converter according to claim 1, wherein the pressure fluid space housing is connected with the converter housing so that the pressure fluid space housing is fixed with respect to rotation relative to the converter housing.

5. The hydrodynamic torque converter according to claim 4, wherein the lockup clutch further comprises at least one friction surface element connected to the turbine wheel so that the at least one friction surface element is fixed with respect to rotation relative to the turbine wheel.

6. The hydrodynamic torque converter according to claim 5, wherein the at least one friction element is clamped between the converter housing and the coupling element for producing rotational coupling of the turbine wheel and converter housing.

7. The hydrodynamic torque converter according to claim 1, wherein the pressure fluid space housing is connected to the turbine wheel so that the pressure fluid space housing is fixed with respect to rotation relative to the turbine wheel.

8. The hydrodynamic torque converter according to claim 5, wherein the coupling element is urged toward the converter housing to produce rotational coupling of the turbine wheel and the converter housing.

9. The hydrodynamic torque converter according to claim 8, further comprising a friction lining pressed between the coupling element and the converter housing.

10. The hydrodynamic torque converter according to claim 1, wherein the pressure fluid space housing is connected to the coupling element so that the pressure fluid space housing is fixed with respect to rotation relative to the coupling element.

11. The hydrodynamic torque converter according to claim 10, further comprising a positive locking engagement means acting in a circumferential direction for connecting the pressure fluid space housing to the coupling element.

12. The hydrodynamic torque converter according to claim 10, further comprising a plurality of leaf spring connection elements for connecting the coupling element to the pressure fluid space housing so that the coupling element is fixed with respect to rotation relative to the pressure fluid space housing.

* * * * *